US010675945B2

(12) United States Patent
Lombrozo et al.

(10) Patent No.: US 10,675,945 B2
(45) Date of Patent: Jun. 9, 2020

(54) SENSOR CONDENSATION PREVENTION

(71) Applicant: Waymo LLC, Mountain View, CA (US)

(72) Inventors: Peter Craig Lombrozo, Scotts Valley, CA (US); Jonathan Switkes, San Jose, CA (US)

(73) Assignee: WAYMO LLC, Mountain View, GA (US)

( * ) Notice: Subject to any disclaimer, the term of this patent is extended or adjusted under 35 U.S.C. 154(b) by 0 days.

(21) Appl. No.: 15/922,483

(22) Filed: Mar. 15, 2018

(65) Prior Publication Data
US 2019/0283533 A1 Sep. 19, 2019

(51) Int. Cl.
G08B 23/00 (2006.01)
B60H 1/00 (2006.01)
G01L 7/20 (2006.01)
B60H 3/02 (2006.01)

(52) U.S. Cl.
CPC ..... B60H 1/00785 (2013.01); B60H 1/00885 (2013.01); B60H 3/024 (2013.01); G01L 7/20 (2013.01)

(58) Field of Classification Search
CPC ............ B60H 1/00785; B60H 1/00885; B60H 3/024; G01L 7/20
USPC ..................................................... 340/693.6
See application file for complete search history.

(56) References Cited

U.S. PATENT DOCUMENTS

| 5,821,428 | A | * | 10/1998 | Taggart | B01J 3/004 |
| | | | | | 73/861.56 |
| 5,857,474 | A | * | 1/1999 | Sakai | B08B 7/00 |
| | | | | | 134/102.3 |
| 6,138,319 | A | | 10/2000 | Benoit | |
| 6,640,462 | B1 | * | 11/2003 | Choi | F26B 5/04 |
| | | | | | 34/396 |
| 8,671,504 | B2 | | 3/2014 | Ono et al. | |
| 8,910,318 | B2 | | 12/2014 | Spiro | |
| 10,053,059 | B1 | * | 8/2018 | Worthen | B60H 1/00785 |
| 2002/0005068 | A1 | * | 1/2002 | Libbrecht | |
| 2007/0095076 | A1 | * | 5/2007 | Duke | C10G 1/04 |
| | | | | | 62/49.2 |

(Continued)

FOREIGN PATENT DOCUMENTS

| KR | 10-2002-0017691 A | 6/2011 |
| KR | 10-20110057842 A | 6/2011 |
| KR | 10-1049687 B1 | 7/2011 |

OTHER PUBLICATIONS

International Search Report and Written Opinion for Application No. PCT/US2018/066018 dated Apr. 18, 2019.

Primary Examiner — Naomi J Small
(74) Attorney, Agent, or Firm — Botos Churchill IP Law LLP

(57) ABSTRACT

This technology relates to a condensation reduction system for a sensor. The system may comprise a sensor cover, wherein the sensor cover is configured to house one or more sensor components, a flexible, external chamber, and a conduit. The external chamber may be communicably coupled to an interior of the sensor cover via the conduit configured such that during an increase of pressure of gas within the sensor cover the gas flows to the external chamber via the conduit and during a decrease in the pressure of gas within the sensor cover the gas flows from the external chamber to the sensor cover via the conduit.

17 Claims, 10 Drawing Sheets

(56) References Cited

U.S. PATENT DOCUMENTS

| | | | |
|---|---|---|---|
| 2008/0314899 A1* | 12/2008 | Berkey | H05K 5/068 |
| | | | 220/203.01 |
| 2009/0213304 A1* | 8/2009 | Dunn | H05K 7/20972 |
| | | | 349/96 |
| 2011/0100400 A1* | 5/2011 | Ostervold | B05B 1/207 |
| | | | 134/21 |
| 2014/0036079 A1 | 2/2014 | Lang et al. | |
| 2015/0266357 A1* | 9/2015 | Bidner | B60H 1/00785 |
| | | | 165/288 |

* cited by examiner

400

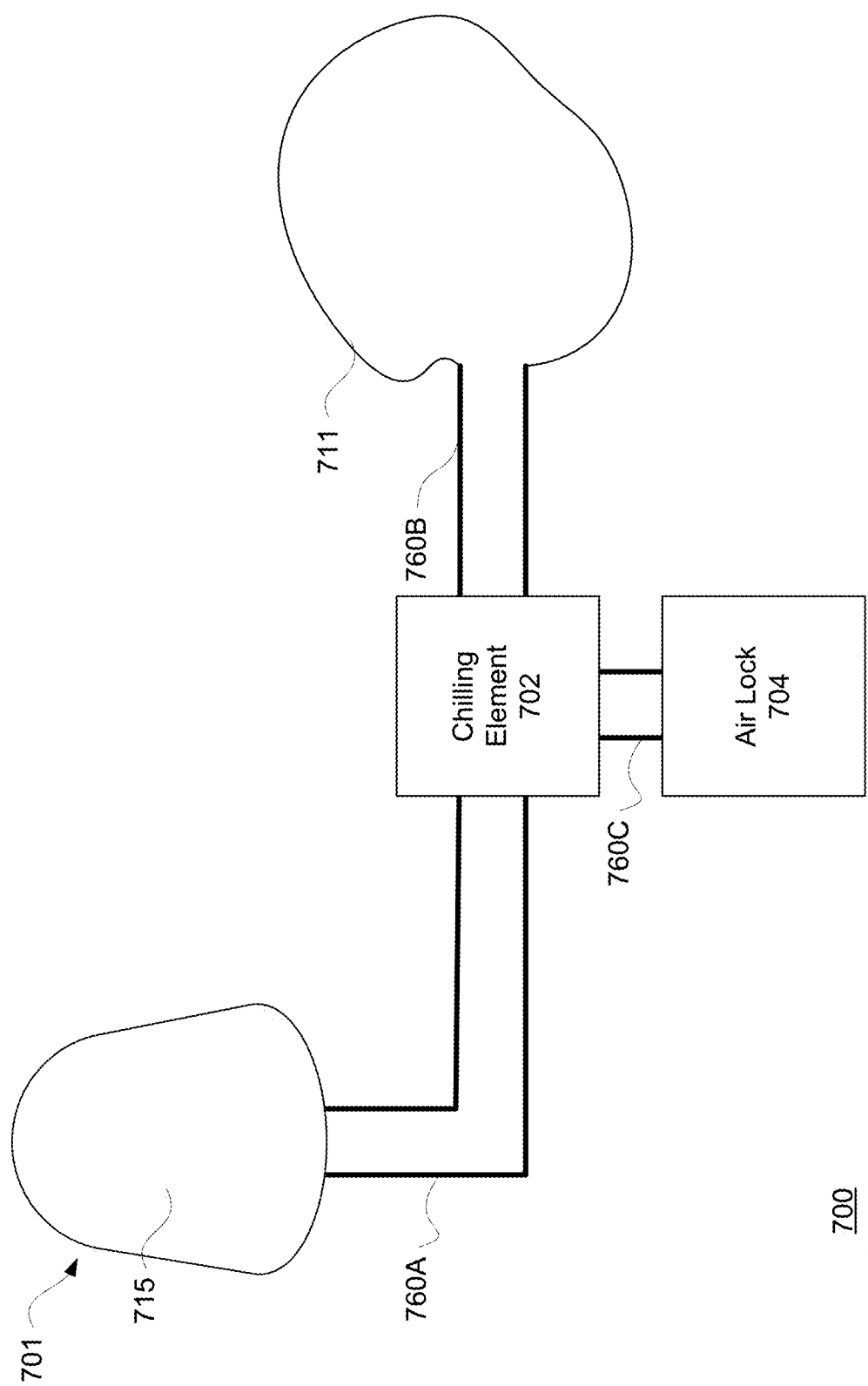

US 10,675,945 B2

SENSOR CONDENSATION PREVENTION

BACKGROUND

Various types of vehicles, such as cars, trucks, motorcycles, busses, boats, airplanes, helicopters, lawn mowers, recreational vehicles, amusement park vehicles, farm equipment, construction equipment, trams, golf carts, trains, trolleys, etc., may be equipped with various types of sensors in order to detect objects in the vehicle's environment. For example, vehicles, such as autonomous vehicles, may include LIDAR, radar, sonar, camera, or other such imaging sensors that scan and record data from the vehicle's environment. Sensor data from one or more of these sensors may be used to detect objects and their respective characteristics (position, shape, heading, speed, etc.).

However, these vehicles are often subjected to environmental elements such as rain, snow, dirt, condensation, etc., which can cause a buildup of debris and contaminants on these sensors. Typically, the sensors include a cover to protect the internal sensor components of the sensors from the debris and contaminants, but over time, the cover itself may become dirty. As such, the functions of the internal sensor components may be impeded as signals transmitted and received by the internal sensor components are blocked by the debris and contaminants.

SUMMARY

One aspect of the disclosure provides a condensation reduction system for a sensor. The system comprising a sensor cover, wherein the sensor cover is configured to house one or more sensor components; a flexible, external chamber; and a conduit; wherein the external chamber is communicably coupled to an interior of the sensor cover via the conduit configured such that during an increase of pressure of gas within the sensor cover the gas flows to the external chamber via the conduit and during a decrease in the pressure of gas within the sensor cover the gas flows from the external chamber to the sensor cover via the conduit.

In some examples the system includes a chilling element positioned in line with the conduit, between the sensor cover and the flexible, external chamber, wherein the chilling element cools the gas as it flows to and from the external chamber and condenses water vapor within the gas. In certain instances the system further includes an airlock configured to pass the condensed water vapor out of the condensation reduction system.

In some examples, the increase of pressure of gas within the sensor cover is generated by an increase of temperature of the gas and the decrease of pressure of gas within the sensor cover is generated by a decrease of temperature of the gas. In some instances, the sensor cover is hermetically sealed. In some instances the sensor cover includes one or more vents which create one or more openings between the interior of the sensor cover ad the exterior of the sensor cover. The vents may include Gore vents.

In some instances the external chamber is integrated into the sensor cover.

In some examples, the system further comprises a nozzle configured to project a directed stream of fluid onto the sensor cover. In some instances, the system may include a pump for providing the nozzle with the fluid. In some instance the nozzle is connected to the pump via a second conduit. In some examples the nozzle is positioned outside of a field of operation of the sensor. In certain instances, the system may further comprise a heater or heat source in communication with the fluid, wherein the heater or heat source heats the fluid.

In some instances the system further comprises a chilling element positioned within the sensor cover, wherein the chilling element cools the gas as it flows to and from the external chamber and condenses water vapor within the gas.

In some instances the system further comprises a monitoring sensor, wherein the monitoring sensor is configured to detect a buildup of one or more elements on the sensor cover. In some examples, the one or more elements are any combination of ice, snow, and condensation. In certain instances the monitoring sensor, upon detecting a buildup of one or more elements on the sensor cover, triggers a fluid removal system to provide a stream of a fluid on the sensor cover.

In some instances, the system further comprises a motor for rotating the sensor cover, wherein the directed stream of fluid is projected onto the sensor cover as the motor rotates the sensor cover.

In some instances, the system further comprises a motor for rotating the nozzle, wherein the directed stream of fluid is projected onto the sensor cover as the motor rotates the nozzle.

In some instances, the system further comprises a vehicle, wherein the condensation reduction system and sensor are mounted to the vehicle.

BRIEF DESCRIPTION OF THE DRAWINGS

The present technology is illustrated by way of example, and not by way of limitation, in the figures of the accompanying drawings in which like reference numerals refer to similar elements including:

FIG. 7 illustrates an external volume system in accordance with aspects of the disclosure.

DETAILED DESCRIPTION

Figure 1:
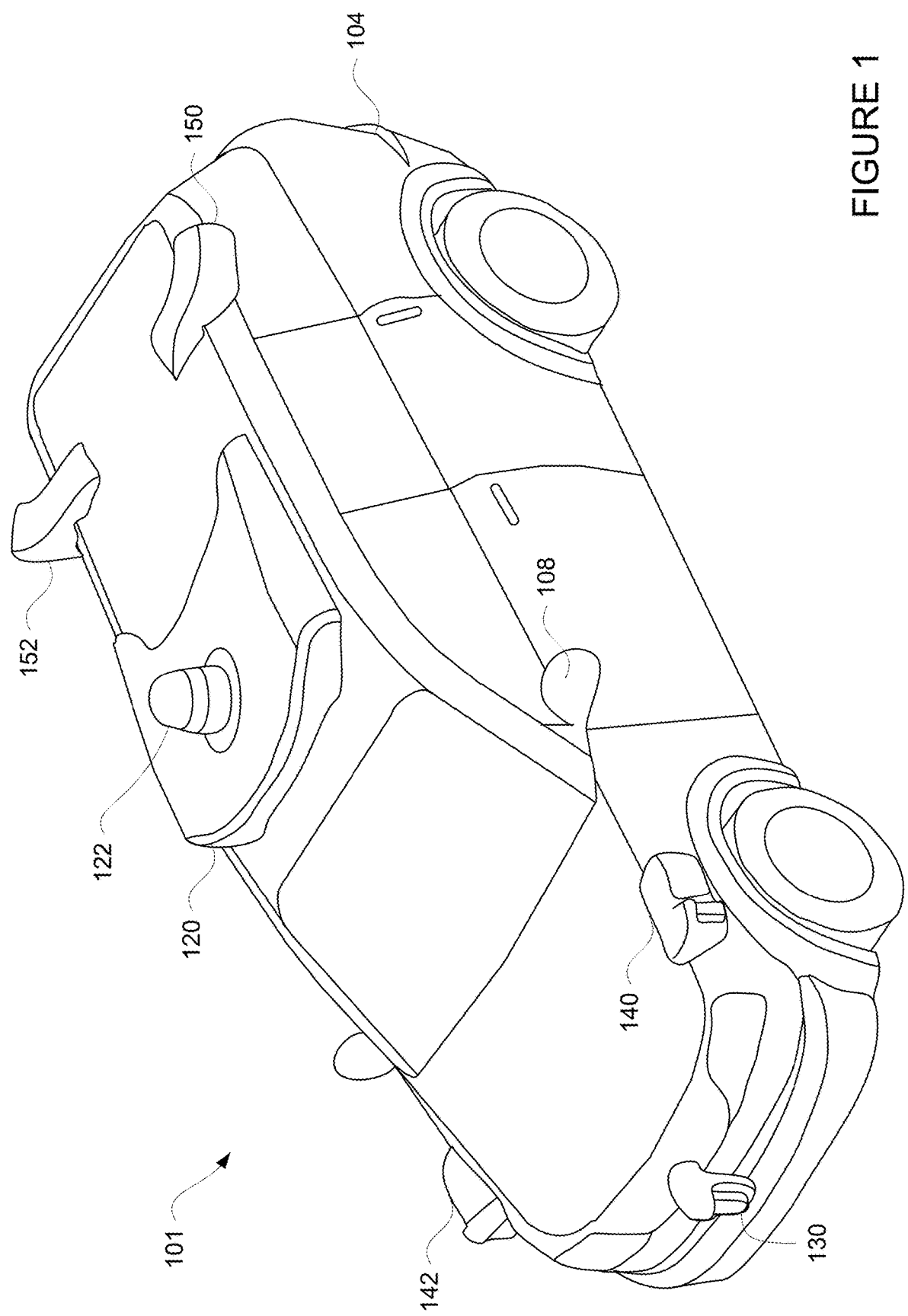
FIG. 1 shows a sensor attached to a vehicle in accordance with aspects of the disclosure.

This technology relates to removing, or otherwise preventing, condensation, ice, snow, and other such elements from building-up on sensors, such as those on an exterior of a vehicle, in order to assure adequate operation. These sensors may include a cover to protect the internal sensor components from elements, such as rain, snow, dust and other such debris. However, the cover itself may become covered over time, such as by rain or ice during a storm. Moreover, temperature differences between the interior of the sensor (i.e., within the sensor cover) and the sensor's external environment (i.e., outside of the sensor cover) may result in the formation of condensation on the sensor's cover. Thus, the functions of internal sensor components of the sensor may be impeded as signals transmitted and received by the internal sensor components may be blocked by the elements and/or condensation. However, as described herein, the issues of debris and condensation buildup on the interior and exterior of a sensor cover may be minimized or removed by applying a stream of fluid to the sensor cover and strategically managing pressure, humidity, and/or temperature within the sensor cover.

As noted above, a vehicle sensor may be comprised of internal sensor components and a cover for housing the internal sensor components. The sensor cover may include a cover window constructed at a specific location on the sensor cover. The internal sensor components may transmit and receive one or more signals through the cover window.

The sensor may be attached to a motor via a sensor shaft. In this regard, a first end of a sensor shaft may be attached to a first motor and the opposite end of the sensor shaft may be connected to the sensor and sensor cover. Upon the first motor rotating the sensor shaft, the sensor cover, the sensor components, and/or the entire sensor may also rotate. In some instances the sensor may be stationary.

Elements which build up on the sensor cover, including the sensor window, may be removed by providing a temporary or continuous stream of a fluid. For instance, a pump may force a fluid through a conduit to a stationary or adjustable nozzle positioned around the sensor cover at a particular pressure. The nozzle may direct the fluid towards the sensor cover to spray away the elements built up on the sensor cover. In some instances the fluid may be directed by the nozzle to locations on the sensor cover where the sensor captures sensor data, such as the sensor window to allow internal sensor components to send and receive signals through windows on the sensor cover unimpeded.

The fluid may be heated by a heater prior to being sprayed onto the sensor cover. In this regard, the heated fluid may be sprayed onto elements on the sensor cover, such as ice and/or snow, causing the elements to be melted by the fluid, as well as blown off.

Additional sensors may be used to monitor the sensor cover for buildup of condensation or elements. The additional sensors may trigger the pump to push the fluid through the nozzle upon a predetermined threshold of buildup occurring. In instances where the additional sensors detect condensation buildup, or the possibility of condensation buildup, the additional sensors may trigger the application of a heated fluid to the cover.

To absorb excess moisture within the sensor cover, a desiccant may be added to the interior of the sensor cover. In this regard, air and water vapor may permeate into the sensor cover through one or more vents or leaks. The desiccant within the sensor cover may absorb the water vapor and any condensed vapor to prevent condensation from building-up on the sensor cover.

The sensor cover may be hermetically sealed to prevent air from leaving or entering the sensor cover. By blocking the interaction of warm air within the sensor cover and cooler air external to the sensor cover, the formation of condensation on the interior or exterior of the sensor cover may be avoided.

An external volume may be coupled to the sensor such that air may flow between the sensor cover the external volume. The external volume may be flexible, and may expand or contract in response to air entering or leaving based on the pressure within the sensor cover. For instance, when the temperature of the air within the sensor cover decreases, air pressure within the sensor cover may decrease. This decrease in air pressure may cause the air to travel to the sensor cover from the external volume, thereby minimizing the pressure differential between the environment external to the sensor and the interiors of the sensor cover and external volume. This may reduce the rate at which moist, external air enters the sensor cover.

A chilling element may be included between the sensor cover and the external volume, or within the sensor cover or external volume. In this regard, air which travels between, or within, the sensor cover and/or the external volume may pass through the chilling element. The chilling element may chill the air as it passes through, thereby condensing some or all of the water out of the air. To remove the condensed water, an airlock may be used to dump or otherwise direct the condensed water out of the system.

While certain aspects of the disclosure are particularly useful in connection with specific types of vehicles, the vehicle may be any type of vehicle including, but not limited to autonomous and semi-autonomous, as well as manually driven and/or operated, cars, trucks, motorcycles, busses, boats, airplanes, helicopters, lawnmowers, recreational vehicles, amusement park vehicles, farm equipment, construction equipment, trams, golf carts, trains, and trolleys. Moreover, the aspects of the disclosure may be useful in connection with objects other than vehicle's, such as wearable sensors, telephones, and other such objects which are subjected to debris and contaminants.

The features described herein may allow for continued use of a sensor even when the sensor's cover, interior or exterior, becomes dirty or wet due to the buildup of debris, condensation, ice, and other such contaminants. By doing such, the sensor may continue operation without interruption or the need for an individual to manually replace desiccant cartridges or clean the sensor cover. As such, the sensor and the vehicle to which the sensor may be mounted may continually operate in environments which produce a lot of debris and contaminants, such as outdoors in the rain or snow or at construction sites or off-road locations. The features described herein may also reduce corrosion and the risk of electrical failure of sensor components due to water buildup and reduce pressure related stress on the sensor cover. Moreover, the features described herein may remove or reduce the need for a wiper to wipe debris and/or contaminants from the sensor's cover, resulting in fewer moving parts to clear the sensor cover and reduced wear on wiper blades and sensor cover. As such, wiping noise and/or vibration, such as generated by a wiper blade rubbing on a sensor cover may be reduced or avoided. Further yet, the features described herein may remove stubborn contaminants from the sensor cover which wipers may be unable to remove by melting and/or blowing such contaminants away.

A vehicle may have one or more sensors to detect objects external to the vehicle such as other vehicles, obstacles in the roadway, traffic signals, signs, trees, etc. For example, the vehicle 101, as shown in FIG. 1, may include lasers, sonar, radar, cameras and/or any other detection devices that capture images and record data which may be processed by computing devices within the vehicle. The vehicle's sensors, such as LIDAR, radar, cameras, sonar, etc. may capture images and detect objects and their characteristics such as location, orientation, size, shape, type, direction and speed of movement, etc. Images may include the raw (i.e., unprocessed) data captured by the sensors and/or pictures and videos captured by camera sensors. Images may also include processed raw data. For instance, the raw data from the sensors and/or the aforementioned characteristics can be quantified or arranged into a descriptive function or vector for processing by the computing devices. The images may be analyzed to determine the vehicle's location, and to detect and respond to objects when needed.

The sensors may be arranged around the vehicle's exterior or interior. For example, housings 130, 140, 142, 150, 152 may include, for example, one or more LIDAR devices. The sensors may also be incorporated into the typical vehicle components, such as taillights/turn signal lights 104 and/or side view mirrors 108. In some instances a laser, radar, sonar, camera(s) or other sensors may be mounted on the roof, such as in housing 122, attached to mount 120.

Figure 2:
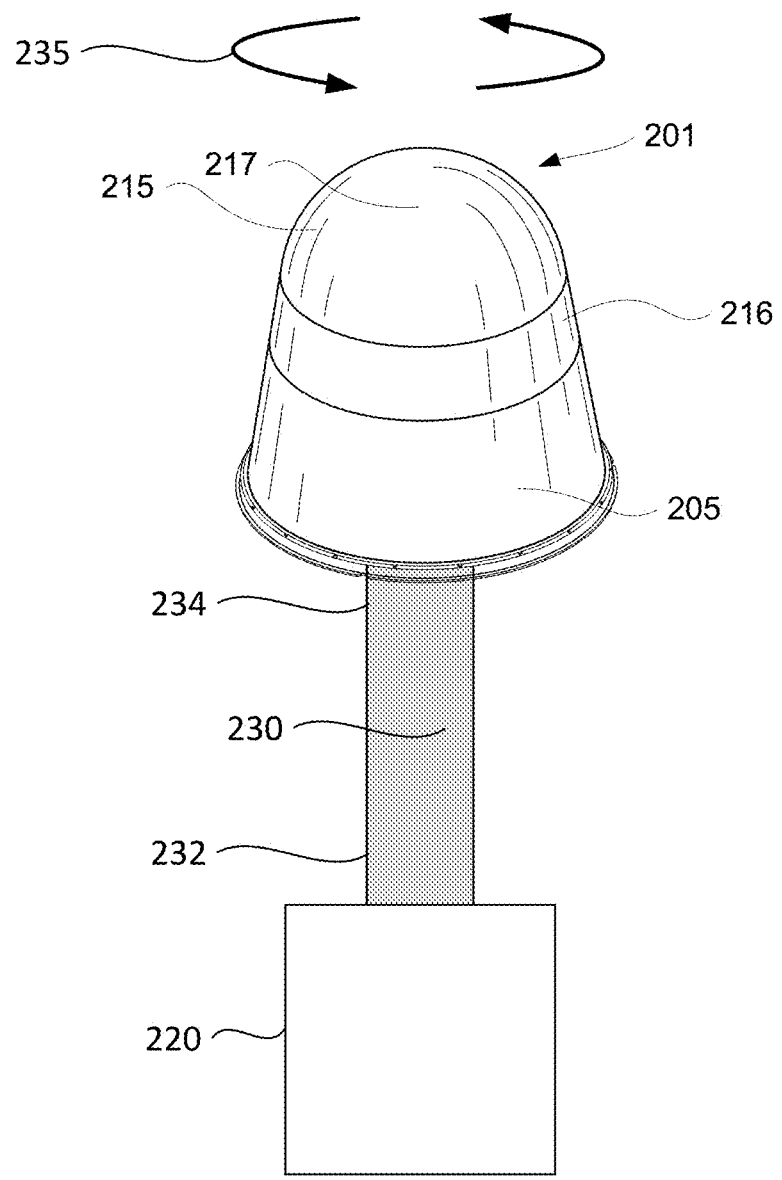
FIG. 2 illustrates a sensor cover connected to a motor in accordance with aspects of the disclosure.

A vehicle sensor may be comprised of internal sensor components, a cover for housing the internal sensor components, and a cover window. The cover window may be constructed at a specific location on the sensor cover and the internal sensor components may transmit and receive one or more signals through the cover window. The sensor cover may be configured in various shapes and sizes, such as spheres, cylinders, cuboids, cones, prisms, pyramids, cubes, etc. For instance, as shown in FIG. 2, the sensor cover 215 of sensor 201 may be configured such that it has a dome shaped portion 217 with a side wall 205 in the shape of a frustum. The sensor cover 215 may be comprised of materials such as plastic, glass, polycarbonate, polystyrene, acrylic, polyester, etc.

As noted above, the cover may include a cover window through which the internal sensor components may transmit and receive signals. For instance, as further shown in FIG. 2, the side wall 205 of the sensor cover 215 may include a cover window 216 incorporated therein, to allow signals (not shown) to penetrate the sensor cover 215. Although the cover window 216 is shown as being only a portion of the sidewall 205, in some instances the entire sidewall 205 may be constructed as a cover window. Further, multiple cover windows may be positioned on the sensor cover 215. The cover window 216 may be composed of the same, or different, material as the sensor cover 215. In some instances the entire sensor cover 215, or a large portion of the sensor cover, may be penetrable by the signals transmitted and received by the internal sensor components, thereby allowing the entire sensor cover 215 to function as a cover window.

The sensor may be attached to a motor via a sensor shaft. For instance, as further shown in FIG. 2, the sensor shaft 230 may include a first end 232 and a second end 234. The first end of the of a sensor shaft 232 may be attached to a sensor motor 220 and the opposite end of the sensor shaft 234 may be connected to the sensor 201 and sensor cover 215. In this regard, the first end of the sensor shaft 232 may be attached to the motor 320 via a belt, gear, chain, friction roller, etc. The motor 220 may rotate the sensor shaft 230 in the first direction 235 causing the entire sensor 201 to also rotate in the first direction 235. In some embodiments the sensor shaft 230 may only rotate the sensor cover 215. The sensor 201 and motor 220 may each be located internally or externally from a vehicle.

Figure 3:
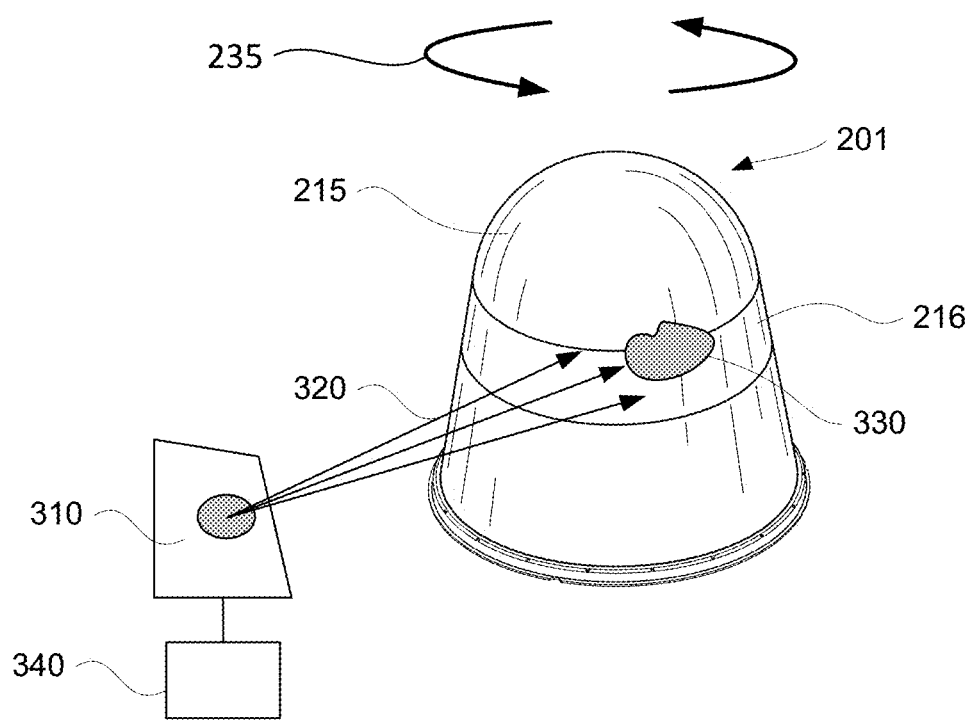
FIG. 3 illustrates a nozzle directing a stream of fluid onto a sensor cover in accordance with aspects of the disclosure.

Elements which build up on the sensor cover may be removed by providing a temporary or continuous stream of a fluid. For instance, contaminants 330, which may represent snow and ice, or other such elements, may build up on the sensor cover 215 of sensor 201 as the vehicle progresses on a trip, such as during a snow and/or ice storm, as shown in FIG. 3. Upon or before the contaminants 330 impact the operation of the sensor's internal components, a nozzle 310, such as a jet nozzle, positioned in the vicinity of the sensor cover 215, may provide a directed stream of fluid 320 to spray and/or melt away the contaminants 330, as further shown in FIG. 3. The fluid may be any type of liquid such as water, anti-freeze, detergent, gas, and/or soap.

Figure 4:
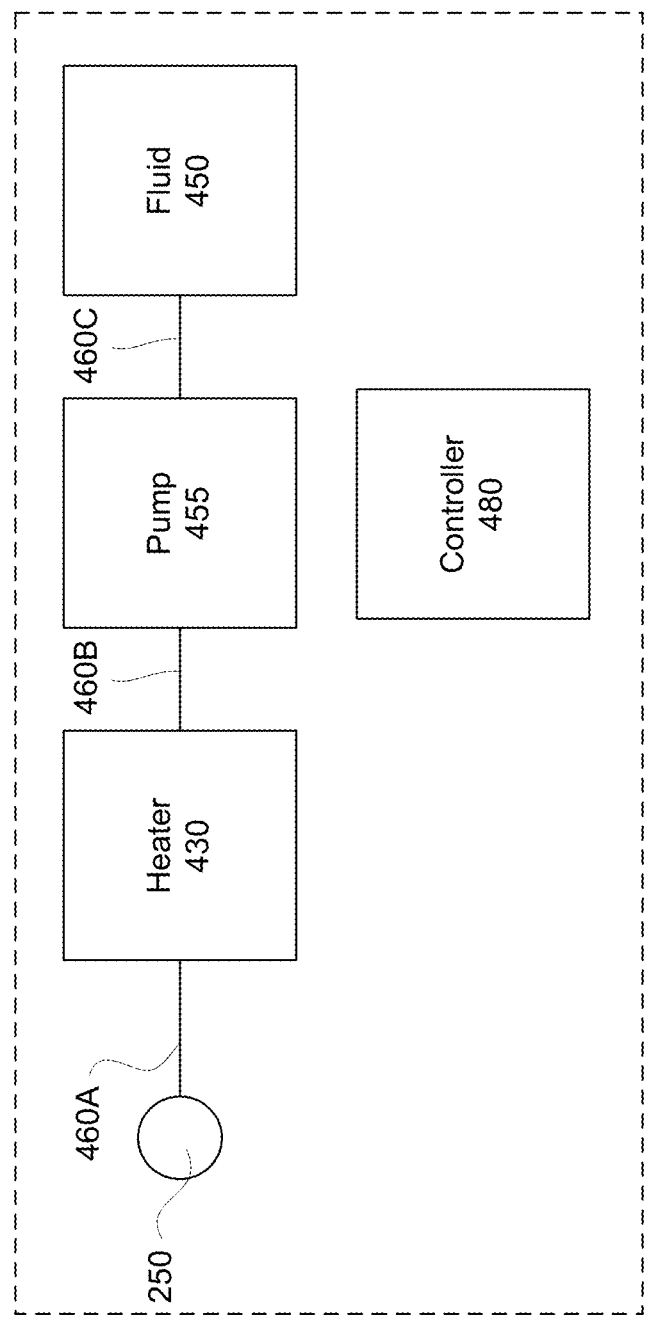
FIG. 4 is a schematic of a sensor condensation prevention system in accordance the disclosure.

The nozzle may be part of a fluid removal system which may include a pump to force the fluid through the nozzle. For instance, the fluid removal system 400, as shown in FIG. 4, may include a pump 455 and nozzle 310. The pump and nozzle may be connected together via one or more conduits 460A-C. The one or more conduits may be rubber, plastic, metal, or other such tubing capable of passing fluids to and from the components of the fluid removal system. Although three conduits 460A-C are shown in FIG. 4, fewer or more conduits may be present in the fluid removal system. In this regard, the number of conduits may be based on the number of devices within the fluid removal system 400 and the number of connections required between these devices. For instance, as the number of nozzles increases, discussed herein, the number of conduits from the pump 455 and/or heater 430 may be increased. Additionally, the fluid removal system may include more than one pump and heater resulting in the need for additional conduits.

The fluid removal system 400 includes a fluid source 450. In this regard, the fluid source 450 may be a plastic reservoir, or other such container, which stores the fluid output by the nozzle 310. For instance, and as shown in FIG. 4, the pump 455 may be connected to the fluid source 450 via conduit 460C. In some instances the pump 455 may be positioned within the fluid source 450. When the fluid removal system 400 is operated, such as through control of the controller 480, the pump 455 may cause the fluid to travel through the conduits 460A-C from the fluid source 450 to the nozzle 310 at a particular pressure.

The nozzle may apply the directed stream of fluid at a particular velocity to the sensor cover. In this regard, referring to both FIGS. 3 and 4, based upon the pressure of the fluid generated by the pump 455 and the flow rate of the nozzle 310, the velocity of the directed stream of fluid 320 output by the nozzle 310 may be controlled and adjusted. In this regard, the flow rate of the nozzle 310 and the pressure generated by the pump 455 may be increased and/or decreased to generate a particular velocity of the directed stream of fluid 320. In some instances, directed stream of fluid may have a velocity of about 8 meter/sec, or more or less, as measured from about 25 mm away from the face of the nozzle, or more or less, to clear a sensor cover, such as sensor cover 215, from about 4 mm away from the face of the nozzle, or more or less.

The nozzle may apply the directed stream of fluid in a particular direction. In this regard, the direction of the nozzle 310 may be stationary or adjustable and may be set such that it sprays the directed stream of fluid on a particular area of the sensor cover. In some instances, the direction of the nozzle may be manually adjusted such that the nozzle may spray the directed stream of fluid on more than one area of the sensor cover. In some instances, the direction of the nozzle 310 may be controlled by a motor 340, such that the direction of the nozzle may be automatically directed to particular locations of the sensor cover, for instance, in response to an instruction from controller 480.

In certain instances, the angle of the directed stream of fluid relative to the sensor cover may be adjusted based on the direction of the nozzle and the velocity of the directed stream of fluid. In this regard, the directed stream of fluid 320 may contact the sensor cover 215 at a particular angle, thereby forcing the elements on the sensor cover, such as contaminants 330 in a particular direction. For instance, the directed stream of fluid 320 may contact the sensor cover such that the contaminants 330 are directed up and away from the sensor window 216.

Although only a single nozzle is illustrated in FIGS. 3 and 4, more than one nozzle may be used. In this regard, more than one of nozzle 310 may be positioned around the sensor 201, such that the nozzles can spray the entirety or portions of the sensor cover 215. In certain instances, more than one nozzle may spray the same area of the sensor cover 215. Although FIG. 3 shows the nozzle 310 as being at the base of the sensor 201, the nozzle 310 may be positioned above or adjacent to the sensor 201. In some instances the nozzle may be positioned outside of a field of operation of the one or more sensors.

In some instances, the sensor cover may be rotated while the one or more nozzles apply directed streams of fluid. For example, as shown in FIG. 3, the sensor cover 215 may be rotated in the first direction 235 while nozzle 310 sprays the directed stream of fluid 320 at the sensor cover 215. By doing such, the directed stream of fluid 320 may contact an entire circumferential portion or area of the sensor cover 215, such as the entirety of the sensor window 216 or some other portion of the sensor cover.

A heater may be used to warm the fluid prior to it being sprayed onto the sensor as it travels from the pump to the nozzle. For example, referring again to the fluid removal system of FIG. 4, a heater 430 may be positioned between the pump 455 and the nozzle 250. As the fluid travels from the pump 455 via conduit 460B to the nozzle 310 via conduit 460A, the heater 430 may heat the fluid. When output by the nozzle 310, the heated fluid may be sprayed onto elements on the sensor cover 215, such as contaminants 330, thereby causing the debris and contaminants to be melted by the fluid, as well as blown off. In some instances, in addition or in lieu of the heater 430, a cooler (not shown) may be used to cool the pressurized fluid prior to being output by the nozzle. The heater 430 may be directly connected to the fluid source, thereby heating the contents of the fluid source, such as the fluid. In some instance, the heater may be separately powered or use waste heat from other components of the vehicle, such as the drive train or electronics cooling loops. To heat or assist the heater in heating the fluid within the fluid source 450, the fluid source 450 may be located in a warm part of the vehicle such as in the cabin or in proximity to a heat source such as the drive train or electronics cooling loops.

Figure 5:
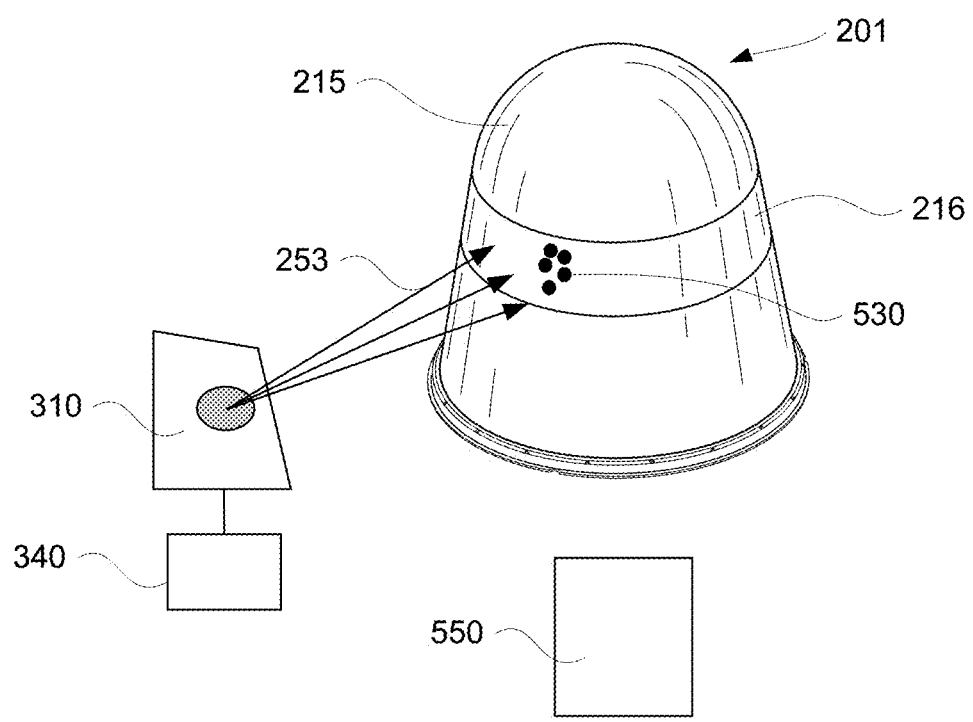
FIG. 5 illustrates a nozzle directing a stream of fluid onto a sensor cover in accordance with aspects of the disclosure.

In some instances the heated fluid may be provided to the sensor cover to prevent or remove condensation buildup. In this regard, applying a temporary or continuous stream of heated fluid to the sensor cover 215 may raise the temperature of the sensor cover, thereby preventing the formation of condensation. The heating of the sensor cover 215 may also cause any condensation on the sensor cover to evaporate more quickly. For instance, FIG. 5 shows condensation 530 built up on sensor window 216 incorporated into sensor cover 215 of sensor 201. A heated directed stream of fluid may be sprayed on the portion of the sensor window 216 where condensation 530 has built up. By doing such, the sensor window 216 may warm up, thereby preventing the formation of additional condensation. Additionally, the heated directed stream of fluid may spray away the built up condensation 530 and/or cause the built up condensation 530 to evaporate quickly. Moreover, the heat added to the exterior surface of the cover may conduct through the sensor cover, heating the inner surface of the sensor cover leading to the evaporation of condensation from the interior surface of the sensor cover.

In some instances the directed stream of fluid may be provided to locations on the sensor cover through which the sensor captures sensor data such as images, light, etc. As discussed herein, internal sensor components may send and receive signals through sensor windows, such as sensor window 216 on the sensor cover 215. Thus, as long as the sensor window 216 remains free of buildup, the internal sensor components may continue to capture sensor data without interference from the elements or condensation. Thus, heated and/or unheated directed streams of fluid may be applied only to the sensor window 216 and/or the areas around the sensor window 216 to prevent the buildup of condensation or elements on the sensor window 216.

In some examples, additional sensors may be used to automatically determine when to apply a fluid to the sensor cover and whether the fluid should be heated. In this regard, the additional sensors, such as one or more moisture sensors or cameras located on the interior or adjacent to the exterior of the sensor cover 215, may be used to monitor the sensor cover for buildup of condensation or elements. Upon a predetermined threshold of buildup occurring, the additional sensors may trigger the application of a fluid to the cover. For instance, sensor 550 of FIG. 5 may monitor the buildup of condensation or elements near or on the sensor 201. Upon the buildup of condensation or elements meeting a predetermined threshold of buildup, the sensor 550 may trigger the controller 480 to operate the fluid removal system 400, and generate an application of fluid to the cover 201. For instance, based on a collection of images, one or more camera sensors may determine an occlusion of a portion of the sensor cover over time as a blockage within the images or a reduction in the sharpness of the image may increase. In some instances, different sensors observing the same scene can be compared to find significant differences which would indicate a problem with one of the sensor views. For example, lidar sensors may detect a sudden and persistent change in return signal intensity and timing over a region of the scene. Depending on the lidar configuration, this may be a spot or a band of change depending whether the window rotates with the sensor. A spinning lidar that sees the scene through multiple windows at alternating periods could observe a difference in scene data from one window versus another, thereby indicating a buildup where intensity is decreased.

Additional sensors may also monitor moisture levels and temperatures in and around the sensors to determine whether condensation may form. Upon determining condensation may form, the additional sensors may trigger the application of a heated fluid to the cover. In some instances, the sensor itself, or an additional sensor, may initiate the application of a fluid to the sensor cover upon determining the internal components' signals are being impeded.

Referring back to FIG. 4, the fluid removal system 400 may include controller 480, such as one or more microprocessor, processors, computer devices, etc. which may control the operation of components of the fluid removal system. In this regard, the controller 480 may be connected to the pump 455 and heater, as well as other components of the system, such as additional sensors described herein, such as the sensor 550 which monitors the sensor cover 215. Upon receiving a signal to engage, or determining that the system should engage based on data received from the additional sensors such as monitoring sensor 550, the controller 480 may trigger one or more components of the fluid removal system 400 to engage. For instance, the controller 480, upon determining a sensor cover, such as sensor cover 215, is covered with condensation or other elements may trigger the pump 455 to engage resulting in nozzle 250 outputting a stream of fluid on the sensor cover. Upon the sensor cover being cleared of the dirt and debris, the controller may disengage the components of the fluid removal system 400. In some instances, the controller may receive temperature and humidity data from within the sensor cover and from the vehicle's exterior to determine whether the heater 430 should be engaged or disengaged during the operation of the fluid removal system. In this regard, should the ambient temperature be below a threshold, such as 40 degrees Fahrenheit, or more or less, the controller may trigger the heater to engage when the pump 420 is engaged.

In some instances the controller may receive a signal from a manually operated input, such as a switch, button, lever, etc. In response to the received signal, the controller 480 may engage or disengage the fluid removal system 400.

Figure 6:
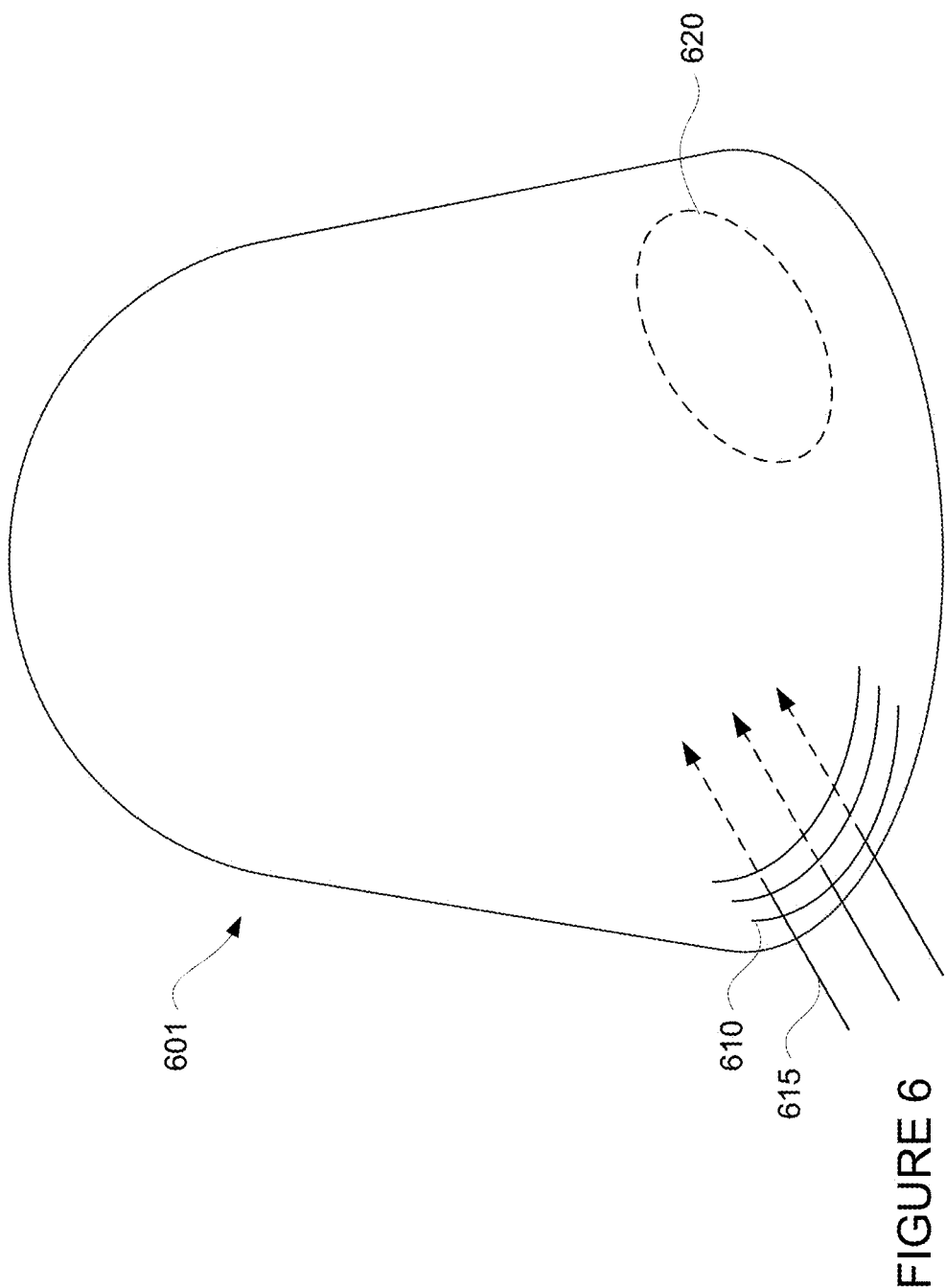
FIG. 6 illustrates a sensor cover with vents in accordance with aspects of the disclosure.

As discussed herein, air, or other such gas, internal to a sensor may be heated during the sensor's operation and hold additional moisture. Cooler air outside of, or near the sensor cover, may interact with and cool the warmer internal air, causing condensation buildup on the interior and/or exterior of the sensor cover. A desiccant may be added to the interior of the sensor to absorb water vapor. For instance, as shown in FIG. 6, the sensor 601, which may be compared to sensor 201, may include one or more vents 610, such as Gore vents. The one or more vents 610 may allow outside air and water vapor to permeate into the interior of the sensor, as illustrated by arrows 615. To prevent the water vapor from condensing, one or more desiccants, such as desiccant cartridge 620, may be added to the interior of the sensor, as further shown in FIG. 6. The desiccant cartridges may absorb the water vapor and any condensed vapor to prevent condensation from building-up on the sensor cover. Upon becoming saturated, the desiccants may be replaced.

Alternatively, the sensor cover may be hermetically sealed to prevent the introduction of moist external air, thereby preventing the formation of condensation. However, during operation of the sensor, fluctuations in temperature may alter the pressure within the sensor relative to the sensor's external environment such that a vacuum is created. This pressure difference may provide a driving force to promote the flow of moisture and standing water through seams, seals and the natural porosity of the plastics and other materials of the enclosure. This pressure difference may also damage the sensor cover and/or internal sensor components. Moreover, in the event the sensor cover is damaged, outside air and water vapor may be pulled into the sensor through the damaged portions, possibly leading to the formation of condensation.

To prevent damage to the sensor cover and/or internal sensor components, a flexible, external volume may be connected with the interior of the sensor cover. In this regard, the external volume may expand or contract in response to pressure fluctuations within the sensor cover, thereby maintaining a relatively steady pressure within the sensor cover. For example, as shown in the external volume system 700 of FIG. 7, a flexible, external volume 711, such as such as a flexible chamber, compartment, container, bellows, bag, collapsible bottle, etc., may be connected to the interior of the sensor cover 715 of sensor 701, which may be compared to sensors 201 and 601. The flexible, external volume may be connected to the interior of the sensor cover via one or more conduits, such as conduits 760A and 760B, as further shown in FIG. 7. The conduits may be a flexible or rigid tube that connects to the interior of the sensor cover on one end to the flexible, external volume on the other end. The conduits may be capable of allowing air to pass from one component external volume system 700. In some instances the external volume 711 and conduit could be a flexible panel on the sensor cover that is allowed to deform as the pressure changes. For instance, the external volume may be a rubber diaphragm, bellows, or other such structure, constructed as a wall, top, or base of the sensor cover and the conduit may be the path between the external volume and the interior of the sensor cover.

Upon the temperature internal to the sensor cover increasing, the air pressure within the sensor cover 715 may increase as the air expands due to the increased heat. The increased air pressure may force air into the flexible, external volume 711 through the conduits and resulting in the flexible, external volume expanding. Upon the temperature internal to the sensor cover 715 decreasing, the air pressure within the sensor cover 715 may decrease, thereby causing the gas in the flexible, external volume 711 to flow back into the sensor cover 715. As such, pressure fluctuations within the sensor cover 701 may be minimized, thereby avoiding damage to the sensor cover. A temperature sensor (not shown) inside of the sensor cover 715 may monitor the internal temperature of the sensor cover.

In some instances, the flexible, external volume may be connected to the interior of a non-hermetically sealed sensor, such as sensor 601 which contains vents, such as gore vents 610 or leakage paths through seals and material porosity. In this instance, the flexible, external volume 711 minimizing the pressure differential between the external environment and the environment internal to the sensor cover and external volume. By doing such, the flexible, external volume 711 may reduce the flow of environmental water vapor into the sensor, thereby minimizing the chances of condensation forming on the sensor cover.

In some instances a chilling element may be added between the sensor cover and the external volume of the external volume system 700. In this regard, as the gas travels between the sensor cover 715 and the flexible, external volume 711, it may pass through the chilling element 702, such as a condenser, as further shown in FIG. 7. The chilling element 702 may be configured such that it is cold enough to condense some or all of the water vapor out of the air as it passes through the conduit. By doing so, the dew point of the overall gas volume is reduced.

The condensed water may be dumped from the chilling element 702 through an airlock 704, as further shown in FIG. 7. In this regard, the chilling element 702 may include the airlock 704 or be connected to the airlock via a conduit such as 760C. The airlock may prevent air from entering the conduit and/or external volume system 700 while simultaneously allowing the condensed water to exit the system. For example, upon the chilling element 702 condensing the water vapor, the water vapor may collect at the airlock 704. The airlock 704 may then dump the condensed water from the external volume system 700.

Figure 8A:
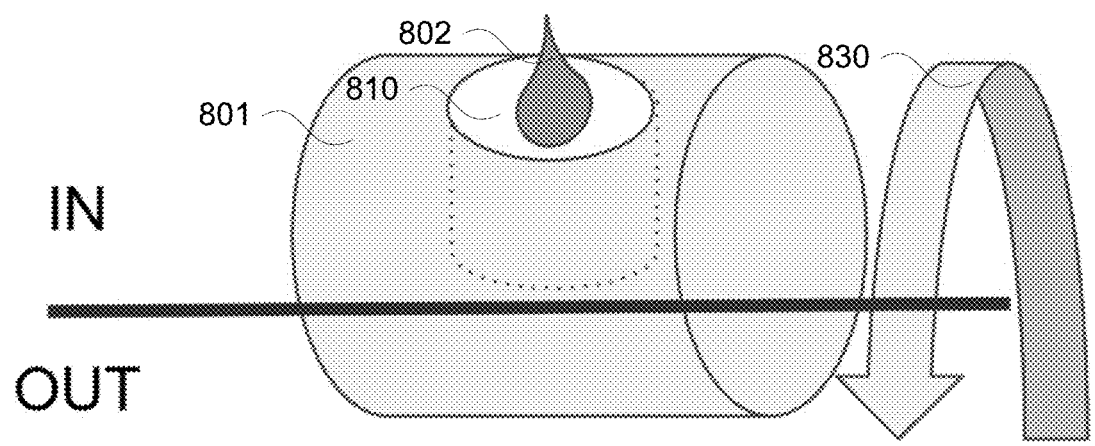
FIGS. 8A and 8B are illustrations of a revolving door lock in accordance with aspects of the disclosure.
Figure 8B:
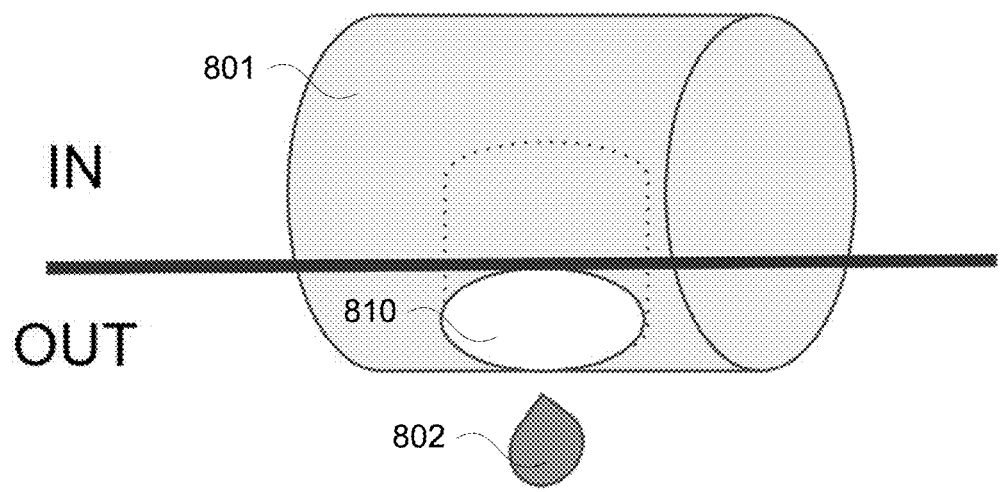

The airlock may be any type of airlock capable of passing through liquid while blocking the transmission of air, such as a p-trap, a p-trap with a sealing liquid, revolving door, float valve, etc. For example, the airlock may be a revolving door 801, as shown in FIGS. 8A and 8B. The revolving door airlock may include a collection chamber 810 in which condensed water 802 may collect. Upon a predetermined amount of condensed water 802 collecting in the collection chamber 802, the revolving door 801 may rotate in a first direct 830, as shown in FIG. 8A. Upon rotating, the collection chamber 810 of the revolving door 801 may be inverted, thereby causing the condensed water to be dumped from the collection chamber 810 to somewhere outside of the external volume system 700, as shown in FIG. 8B.

Figure 9A:
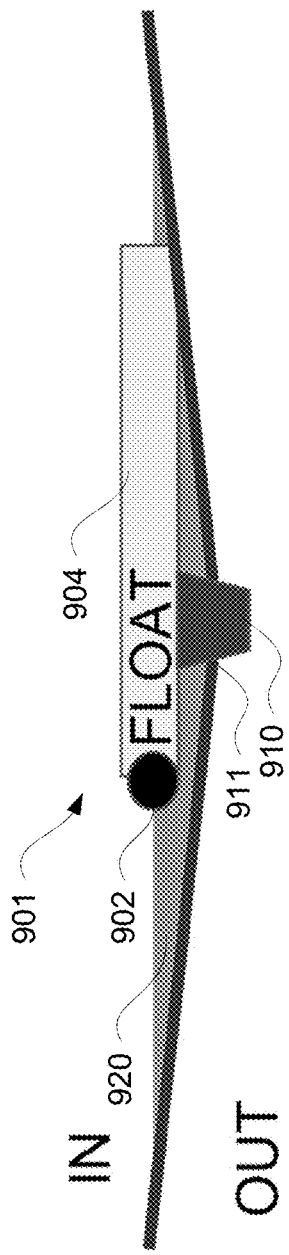
FIGS. 9A and 9B are illustrations of float valves in accordance with aspects of the disclosure.
Figure 9B:
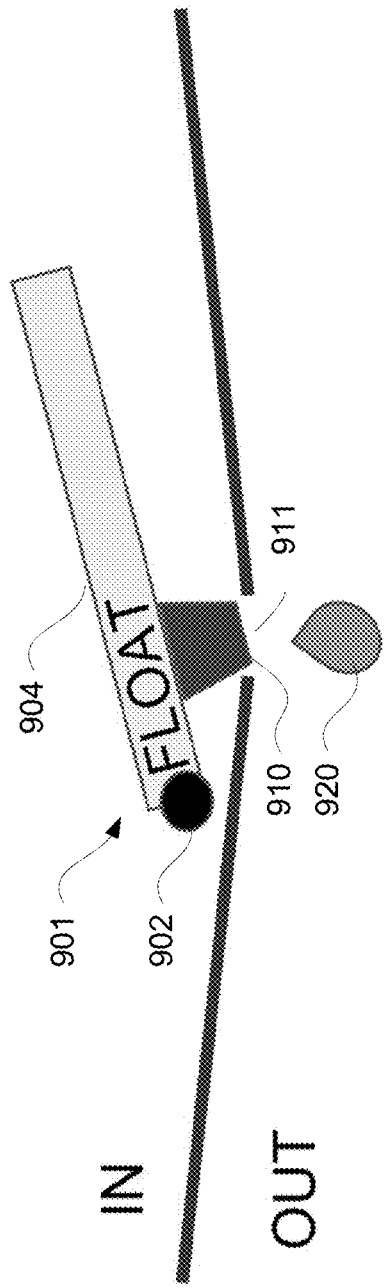

The airlock may alternatively be a float valve is shown in FIGS. 9A and 9B. The float valve 901 may include a weight 902, a stopper 910, and a float 904, as shown in FIG. 9A. The weight 902 of the float valve may force the stopper 910 to slide into a gap 911 of the float valve. As condensed water 920 builds up in the float valve 901, the float 904 may begin to lift. Upon enough condensed water 920 collecting in the float valve 901, the float may cause the stopper 910 to lift out of the gap 911, thereby causing the condensed water 920 to pass through the gap 911, as shown in FIG. 9B. As the condensed water drains from the float valve 901, the weight 902 may direct the stopper 910 back into the gap, thereby sealing the gap once a predetermined amount of condensed water is released. The float valve may also be powered open and closed with a motor, solenoid, or other element.

Figure 10:
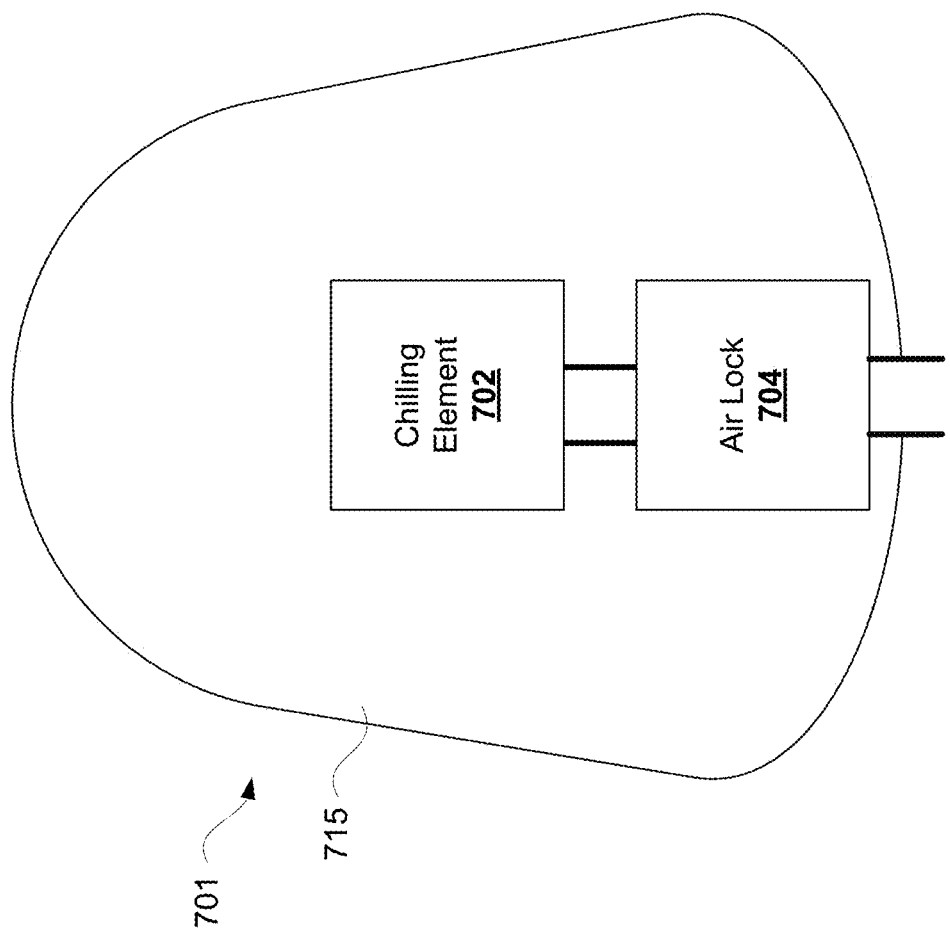
FIG. 10 is an illustration of an internal view of a sensor cover in which a chilling element and airlock are positioned in accordance with aspects of the disclosure.

In some instances, the chilling element 702 may be positioned within the sensor cover 715 of the sensor 701, as shown in FIG. 10. In this regard, some or all of the gas which flows into the sensor cover may be chilled, and the water may be condensed out. All condensed water may then pass through an airlock 704 to be removed from the interior of the sensor cover 715.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A condensation reduction system for a sensor, the system comprising:
    a sensor cover, wherein the sensor cover is configured to house one or more sensor components;
    a flexible, external chamber;
    a conduit;
    an airlock configured to pass condensed water vapor out of the condensation reduction system; and
    a chilling element positioned in line with the conduit, between the sensor cover and the flexible, external chamber,
    wherein the external chamber is communicably coupled to an interior of the sensor cover via the conduit configured such that during an increase of pressure of gas within the sensor cover the gas flows to the external chamber via the conduit and during a decrease in the pressure of gas within the sensor cover the gas flows from the external chamber to the sensor cover via the conduit, and wherein the chilling element is configured to condense water vapor within the gas as it flows to and from the external chamber.

2. The system of claim 1, wherein the increase of pressure of gas within the sensor cover is generated by an increase of temperature of the gas and the decrease of pressure of gas within the sensor cover is generated by a decrease of temperature of the gas.

3. The system of claim 1, wherein the sensor cover is hermetically sealed.

4. The system of claim 1, wherein the sensor cover includes one or more vents which create one or more openings between the interior of the sensor cover and the exterior of the sensor cover.

5. The system of claim 1, wherein external chamber is integrated into the sensor cover.

6. The system of claim 1, further comprising a nozzle configured to project a directed stream of liquid onto the sensor cover.

7. The system of claim 6, further comprising a pump for providing the nozzle with the liquid.

8. The system of claim 7, wherein the nozzle is connected to the pump via a second conduit.

9. The system of claim 7, further comprising a heater or heat source in communication with the liquid, wherein the heater or heat source heats the liquid.

10. The system of claim 7, wherein the nozzle is positioned outside of a field of operation of the sensor.

11. The system of claim 1 further comprising a monitoring sensor, wherein the monitoring sensor is configured to detect a buildup of one or more elements on the sensor cover.

12. The system of claim 11, wherein the one or more elements are any combination of ice, snow, and condensation.

13. The system of claim 11, wherein the monitoring sensor, upon detecting a buildup of one or more elements on the sensor cover, triggers a fluid removal system to provide a stream of a fluid on the sensor cover.

14. The system of claim 6, further comprising a motor for rotating the sensor cover, wherein the directed stream of fluid is projected onto the sensor cover as the motor rotates the sensor cover.

15. The system of claim 6, further comprising a motor for rotating the nozzle, wherein the directed stream of fluid is projected onto the sensor cover as the motor rotates the nozzle.

16. The system of claim 1, further comprising a vehicle, wherein the condensation reduction system and sensor are mounted to the vehicle.

17. The system of claim 1, wherein the airlock is configured to pass through liquid, while blocking transmission of air.

* * * * *